United States Patent
Ogrinz

(10) Patent No.: US 9,171,148 B1
(45) Date of Patent: Oct. 27, 2015

(54) PROCESS FOR REPORTING AND REMEDIATING APPLICATION DEVELOPMENT STANDARDS

(71) Applicant: BANK OF AMERICA CORPORATION, Charlotte, NC (US)

(72) Inventor: Michael Emil Ogrinz, Easton, CT (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 14/250,439

(22) Filed: Apr. 11, 2014

(51) Int. Cl.
- G08B 23/00 (2006.01)
- G06F 21/51 (2013.01)
- G06F 21/57 (2013.01)

(52) U.S. Cl.
CPC .............. G06F 21/51 (2013.01); G06F 21/577 (2013.01)

(58) Field of Classification Search
None
See application file for complete search history.

(56) References Cited

U.S. PATENT DOCUMENTS

| | | | |
|---|---|---|---|
| 6,418,444 B1 * | 7/2002 | Raduchel et al. | 717/126 |
| 2008/0071617 A1 * | 3/2008 | Ware | 705/14 |

* cited by examiner

*Primary Examiner* — Brandon Hoffman
(74) *Attorney, Agent, or Firm* — Michael A. Springs; Moore & Van Allen PLLC

(57) ABSTRACT

Embodiments disclosed herein relate to systems, methods, and computer program products for a system for monitoring application development standards. The system, method, and computer program product are configured to access application code on a server associated with a network, wherein the application code is installed on the server; scan the application code to identify applications that are integrated into the application code; identify products in the application code based on the scan, wherein the products are identified based on a textual analysis of the application code; compare the products identified in the application code to a list of non-allowed products; identify non-allowed products in the application code based on the comparison of the products to the list; determine an allowed product as an alternative to the non-allowed product; and provide a report to a user comprising the non-allowed product and the alternative allowed product.

11 Claims, 3 Drawing Sheets

PROCESS FOR REPORTING AND REMEDIATING APPLICATION DEVELOPMENT STANDARDS

BACKGROUND

Employees or computer users associated with an institution often install applications on computers, servers, or processing devices without first confirming with the system administrator or other IT professional regarding the appropriateness and efficiency of the application. In some situations, this installed software causes issues with the functioning of the computer, with other applications installed on the computer, or with the network itself. In other situations, installation of an application on a computer raises licensing issues with the provider of the application. In these situations, it may be best practices to uninstall the application from the server. Nevertheless, the employees often desire the functionality provided by the application and would like if an acceptable substitute could be implemented to replace the removed application.

While systems administrators attempt to monitor installation of programs on servers associated with the system, in large systems this is extremely difficult to do because of the number of users and/or systems. The system administrator may not know what software is installed or even what is not allowed. Even if the system administrator knows what is not allowed, the system administrator may not know an acceptable substitute for the software that is removed.

Thus, there is a need for a system and method that can assist users in monitoring and remediating application development standards to remove non-allowed applications and recommend acceptable alternatives.

BRIEF SUMMARY

The following presents a simplified summary of one or more embodiments of the disclosure in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments disclosed herein address the above needs and/or achieve other advantages by providing an apparatus (e.g., a system, computer program product, and/or other device) and a computer-implemented method for monitoring application development standards. The system monitors applications and/or products that have been installed on servers and identifies applications and products that are not allowed to be installed. There are various reasons applications may not be permitted on the server, from incompatibility to license agreements. The system identifies these applications and, in some embodiments, recommends alternative products.

In a first aspect, an apparatus for monitoring application development standards is provided, wherein the apparatus evaluates application source code and identifies non-approved application code, whereby recommended alternative application code may be recommended. In some embodiments, the apparatus includes a memory; a computing processor; and a module stored in the memory, said module comprising instruction code executable by one or more computing processors, and configured to cause the one or more computing processors to: accessing application code on a server associated with a network, wherein the application code is installed on the server; scanning the application code to identify applications or portions of applications that are integrated into the application code; identifying products in the application code based on the scan, wherein the products are identified based on a textual analysis of the application code; comparing the products identified in the application code to a list of non-allowed products, wherein the list is stored in a database; identifying non-allowed products in the application code based on the comparison of the products to the list; determining an allowed product as an alternative to the non-allowed product; and providing a report to a user comprising the non-allowed product and the alternative allowed product.

In some embodiments, the application code is converted from compiled code into human-readable code by a translator prior to scanning the application code. In an embodiment, the product is identified based on a diagnostic feature of the product determined based on the scan of the application, wherein the diagnostic feature is selected from the group consisting of metadata associated with the product, directory structure associated with the product, and keywords associated with the product. In still further embodiments, the module further comprises instruction code executable by one or more computing processors, and configured to cause the one or more computing processors to: remove the non-allowed product from the server; and install the alternative allowed product on the server. In some embodiments, the report further comprises a list of users that installed the non-allowed product on a server. In still further embodiments, comparing the products identified in the application code to the list of non-allowed products comprises determining within a predetermined confidence level that the product identified in the application code is a product on the list of non-allowed products. In an embodiment, the non-allowed product is associated with a license agreement for which the maximum number of licenses has been used and the alternative product is associated with a license agreement for which the maximum number of licenses has not been used.

In a second aspect, a computer program product for monitoring application development standards is provided, wherein the computer program product evaluates application source code and identifies non-approved application code, whereby recommended alternative application code may be recommended. In some embodiments, the computer program product includes a non-transitory computer-readable medium comprising: an executable portion for causing a computer to access application code on a server associated with a network, wherein the application code is installed on the server; an executable portion for causing a computer to scan the application code to identify applications or portions of applications that are integrated into the application code; an executable portion for causing a computer to identify products in the application code based on the scan, wherein the products are identified based on a textual analysis of the application code; an executable portion for causing a computer to compare the products identified in the application code to a list of non-allowed products, wherein the list is stored in a database; an executable portion for causing a computer to identify non-allowed products in the application code based on the comparison of the products to the list; an executable portion for causing a computer to determine an allowed product as an alternative to the non-allowed product; and an executable portion for causing a computer to provide a report to a user comprising the non-allowed product and the alternative allowed product.

In a third aspect, a computer-implemented method for monitoring application development standards is provided, wherein the method evaluates application source code and identifies non-approved application code, whereby recommended alternative application code may be recommended. In some embodiments, the method includes accessing application code on a server associated with a network, wherein the application code is installed on the server; scanning the application code to identify applications or portions of applications that are integrated into the application code; identifying products in the application code based on the scan, wherein the products are identified based on a textual analysis of the application code; comparing the products identified in the application code to a list of non-allowed products, wherein the list is stored in a database; identifying non-allowed products in the application code based on the comparison of the products to the list; determining, via a computing device processor, an allowed product as an alternative to the non-allowed product; and providing a report to a user comprising the non-allowed product and the alternative allowed product.

Other aspects and features, as recited by the claims, will become apparent to those skilled in the art upon review of the following non-limited detailed description of the disclosure in conjunction with the accompanying figures.

BRIEF DESCRIPTION OF THE SEVERAL VIEWS OF THE DRAWINGS

Figure 1:
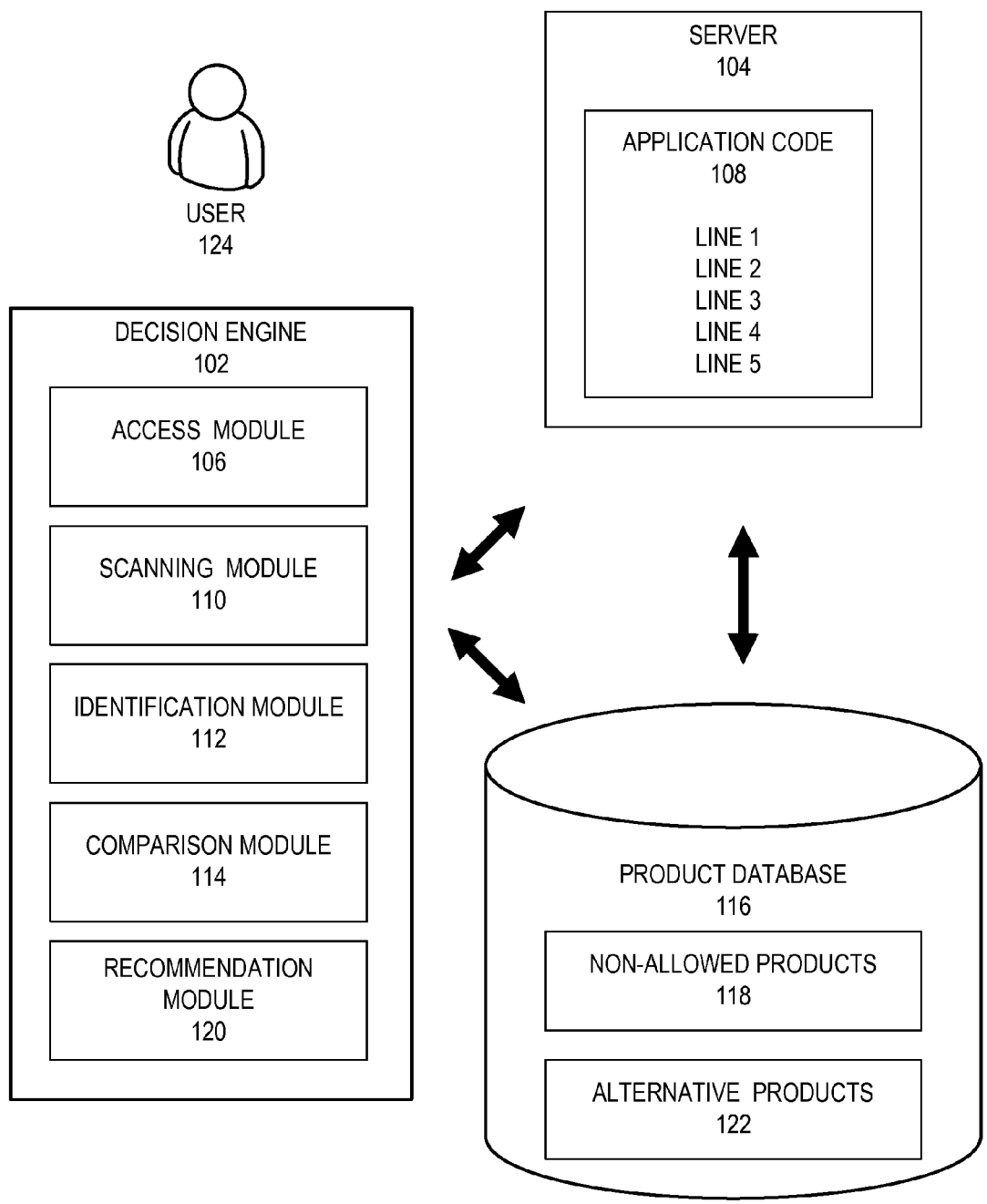
Figure 2:
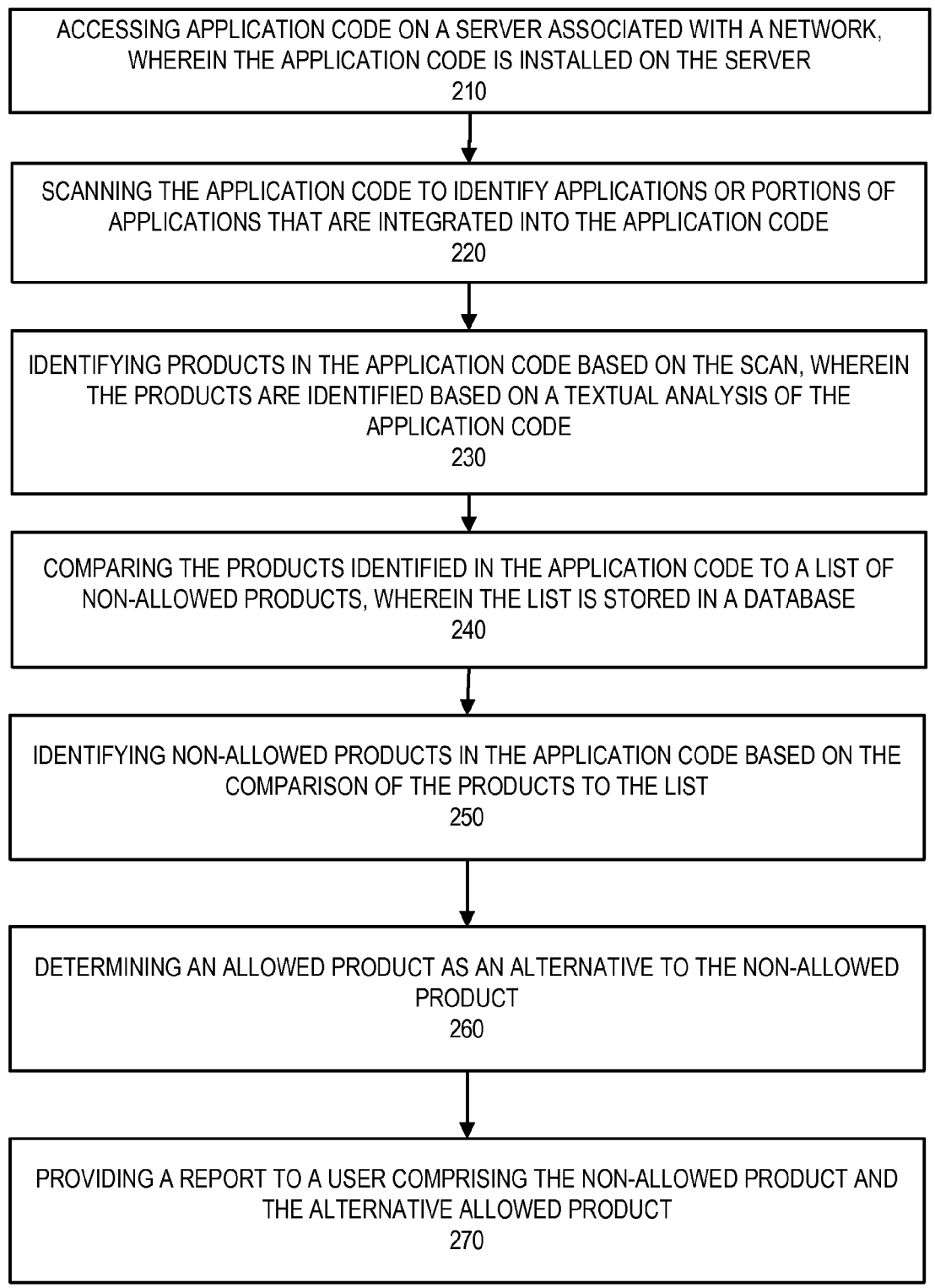
Figure 3:
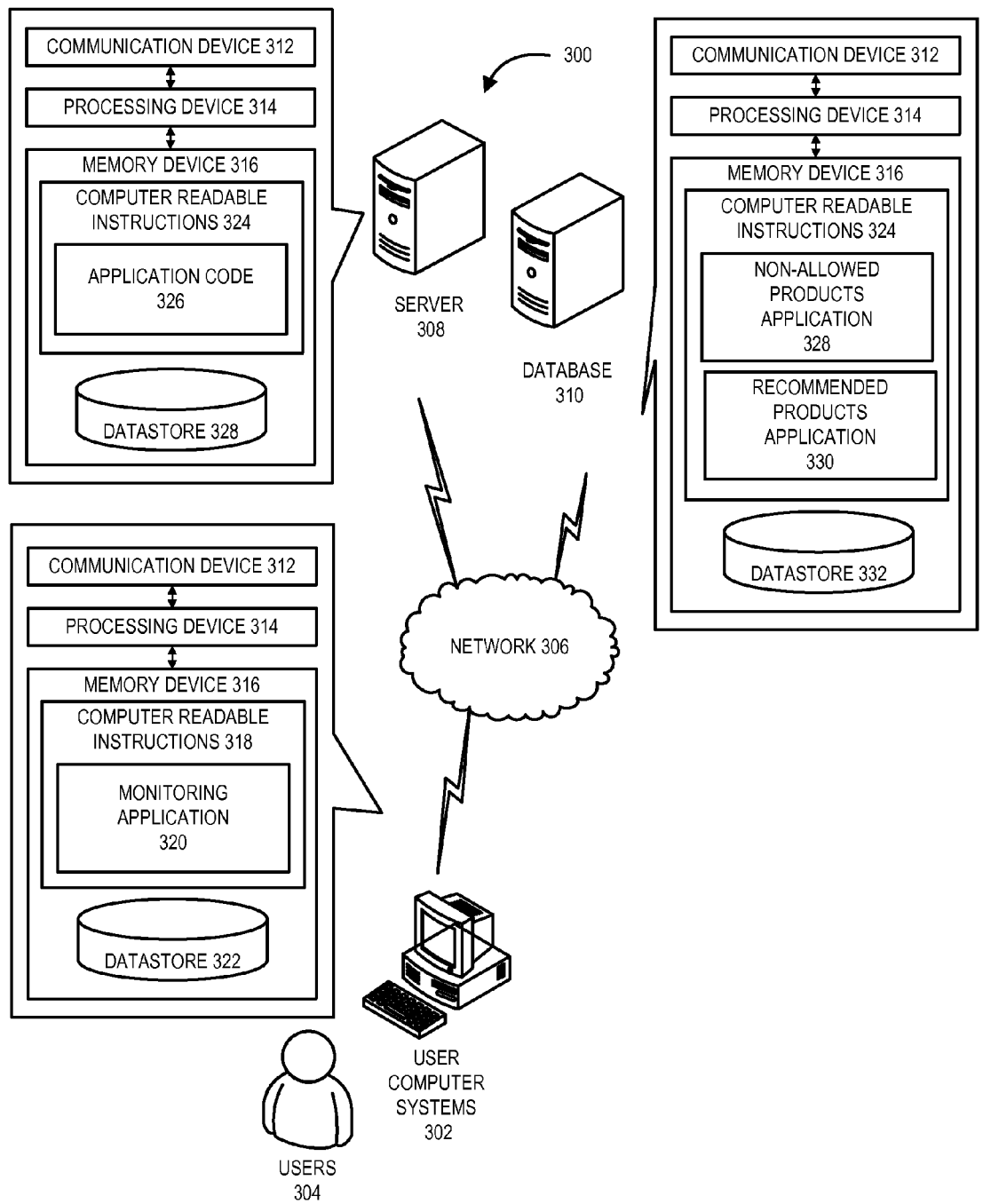

Having thus described embodiments in general terms, reference will now be made to the accompanying drawings, which are not necessarily drawn to scale, and wherein:

FIG. 1 provides a application development standards monitoring environment wherein a system monitors servers for non-allowed products and provides recommendations for alternative products, in accordance with one embodiment of the present disclosure;

FIG. 2 provides a application development standards monitoring process in which a system may scan servers for products and compare the identified products to a list of non-allowed products stored in a database, in accordance with one embodiment of the present disclosure; and FIG. 3 provides illustrates a block diagram for an application development standards monitoring environment and system, in accordance with one embodiment of the present disclosure.

DETAILED DESCRIPTION

Embodiments will now be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire method and system on their own computer systems or even a single work station if appropriate databases are present and can be accessed.

FIG. 1 illustrates an environment 100 in which a system comprising a decision engine 102 monitors at least one server 104 to determine whether non-allowed products are installed on the at least one server 104. The decision may be, for example, a computing device processor configured to perform the functionalities disclosed in the modules stored therein. The decision engine 102 includes an access module 106 that provides access to the application code 108 on the at least one server 104. As will be discussed in further detail in FIG. 2, the access module 106 may access the server 104 over a network. The access module provides access to application code 108 on the server, which may include multiple lines of code associated with applications installed on the server 104.

The decision engine 102 may also include a scanning module 110 that scans the lines of code in the application code 108. In an embodiment, the scanning module 110 reads the application code, and in some embodiments translates the application code in order to read the application code.

In an embodiment, the decision engine 102 may include an identification module 112 that is configured to identify applications and/or products on the server 104 based on the scanning of the application code 108. In some embodiments, the identification module 112 identifies the application or product based textual analysis of the application code 108. For example, the application code 108 may include diagnostic features that indicate a specific product is installed on the server 104.

In some embodiments, the decision engine 102 includes a comparison module 114 that takes the identified products from the identification module 112 and compares the products to a list of non-allowed products 118 in a product database 116. The list of non-allowed products may include products that are not allowed because of license agreements, security issues, incompatibility issues, or the like.

In further embodiments, the decision engine 102 also accesses a list of alternative products 122 on the product database 116. The recommendation module 120 on the decision engine 102 may recommend alternative products in substitution for the non-allowed products. The decision engine 102 may provide reports to a user 124, such as a system administrator, regarding the non-allowed products installed on the server as well as permitted alternative products.

Additional embodiments will now be described in further detail in order to provide additional concepts and examples related to how application development standards may be monitored in accordance with additional embodiments of the disclosure.

Turning now to FIG. 2, a system and method are disclosed for monitoring application development standards. In an embodiment, the system and/or method evaluates application source code and identified non-approved application code. In further embodiments, the system and/or method recommends alternative application code. In some embodiments, the system and method performs these functions by accessing application code on a server associated with a network, wherein the application code is installed on the server; scanning the application code to identify applications or portions of applications that are integrated into the application code; identifying products in the application code based on the scan, wherein the products are identified based on a textual analysis of the application code; comparing the products identified in the application code to a list of non-allowed products, wherein the list is stored in a database; identifying non-allowed products in the application code based on the comparison of the products to the list; determining an allowed product as an alternative to the non-allowed product; and providing a report to a user comprising the non-allowed product and the alternative allowed product.

In block 210, the system accesses application code on a server associated with a network. In some embodiments, the application code is installed on the server. In an embodiment, application code may be source code or compiled code. The application code may be computer instructions written using human-readable or computer-readable language, in some cases with comments, that implement actions performed by the computer. In an embodiment, the application code is written in a single programming language. In some embodiments, however, the application code may be written in multiple programming languages, corresponding to different applications or products that are installed via the application code.

In some embodiments, the application code is a portion of code related to software. For example, the code may be a printer driver, a logging driver, or other type of driver that is related to software but not a part of the software. In some embodiments, the system accesses libraries or library directories to identify code, e.g., a charting library. Other components may include components of security software, tracking software, or other utilities. In an exemplary embodiment, the system may identify web server data, such as an unauthorized or older version of a web server, that is then scanned.

In an embodiment, the application code is stored in a text file in a directory on the server. The application code may be hidden from users or available to users. In some embodiments, the application code is decompiled in order to be reviewed. In further embodiments, an interpreter may convert machine code into source code that is readable by a human.

In an embodiment, a server is one of a group of interconnected computing device processors and/or memory units. Many institutions from financial institution to home networks may include servers connected via a network. In an exemplary embodiment, the server is a computing device processor of an institution and is connected and capable of hosting an application that will run on the server and affect the server and/or other servers or front-end devices associated with the network.

In an embodiment, a network is a wired and/or wireless communication channel that permits data to transfer from one server to another server. In an embodiment, the network may be a global area network (GAN), such as the Internet, a wide area network (WAN), a local area network (LAN), or any other type of network or combination of networks. The network may provide for wireline, wireless, or a combination of wireline and wireless communication between devices on the network.

In an embodiment, the application code is accessed over the network. For example, the system may connect to the server over the network and open a file, e.g., a text file or a compiled file, in order to access the application code. As discussed, in some embodiments the application code is source code that is readably by a human but in other embodiments the application code is compiled by a computer and either accessed as compiled code or interpreted and converted into source code. In some embodiments, the code is graphical in nature and converted into textual code by the system.

In an embodiment, installed on the server means that the application code is stored on the server. In some embodiments, the application code is capable of being executed on the server but in other embodiments the application code is only stored on the server but incapable of being executed without further action.

In block 220, the system scans the application code to identify applications or portions of applications that are integrated into the application code. In an embodiment, the system scans the application code by accessing the application code and reviewing the code. For example, the system may open the file comprising the application code and review the code line by line or section by section. In an embodiment, the system reviews the application code for identifiable text. In an embodiment, the system reads the application code. For example, the system may use text identification software or review the code using a reader of some type.

In an embodiment, the system scans the application code on a regular schedule. For example, the system may scan the application code every night or every week or every month. In some embodiments, the system scans the application code upon request by an administrator. For example, a systems administrator may desire a report of all of the products installed on servers on the network.

In some embodiments, the system scans the application code for applications. An application, as used herein, is a product or service installed on a server that causes a computer to perform tasks beyond the running of the server itself. The application may be installed by the end user of a computer associated with the server, or installed by another application on the server. For example, some applications automatically install additional applications on a server when updated.

In some embodiments, the system scans the application code for portions of applications. For example, the system may scan the application code for a diagnostic feature of an application. For example, a portion of an application may contain a diagnostic characteristic that permits the system to identify the application. In this example, the application may be separated into different portions of memory on the system.

As used herein, integrated means that the application is installed on the server and therefore the code implementing the application is embedded or encoded into the application code on the server.

In block 230, the system identifies products in the application code based on the scan. In some embodiments, the products are identified based on a textual analysis of the application code. In some embodiments, a product is an application that performs an action or service on the server. For example, the product may be an application that is installed on the server, such as a social media application, an instant messaging application, or the like. In some embodiments, the application is the product. That is, in some embodiments, an application is installed on the server and is a product that provides a service or action when executed. In some embodiments, the application is a portion of the product. For example, an application may be associated with a cloud computing product, such as a cloud-based storage device. The application on the server provides access to the complete product, which also includes the software and hardware implemented via the cloud-based server.

In an embodiment, the system identifies the products based on diagnostic characteristics in the application code. For example, a tag or key may be associated with a specific product. In another example, an application may include metadata in the application code that permits the system to identify the product. In some embodiments, the product is identified based on a combination of elements or an arrangement of elements that is only present when the product is present. In still further embodiments, the product is identified based on presence of folders or directory structure that is created by the product.

In an exemplary embodiment, textual analysis is performed to determine the identity of the products on the server. For example, the metadata may be read and textual analysis performed to identify the name of the product installed on the server. In some embodiments, the textual analysis identifies the characteristics of the application code or directory structure that are only present when the product is installed on the system.

In block 240, the system compares the products identified in the application code to a list of non-allowed products. In some embodiments, the list of non-allowed products is stored in a database. In an embodiment, the system compares the identified products to a list of products in the database that have been identified as non-recommended for installation on the servers. There may be various reasons why an application or product is not recommended. For example, the application may be less secure than a recommended product, or less efficient, or less advanced. In some embodiments, an application is not recommended because an alternative product is better for the intended use of the product. In some embodiments, a product is not recommended because of licensing issues with the product. For example, the institution managing the servers may have purchased a license for a certain number of products to be installed or may have purchased a license for a competitive product. In some embodiments, products are not allowed because they cause incompatibility with other products on the server.

In an embodiment, the non-allowed products are maintained on a list in the database. The list may include the date the product was determined to not be allowed, the version that is not allowed, the reason the product is not allowed to be installed, and other information relating to the product (e.g., manufacturer, size, purpose). In some embodiments, the database is updated periodically with new products that are not allowed and products may be removed from the list.

In block 250, the system identifies non-allowed products in the application code based on the comparison of the products to the list. In an embodiment, the system accesses the database after identifying one or more products in the application code and compares the identified products to the list of the non-allowed products in the database. The product may be identified within a specific level of confidence. For example, the product listed in the database may differ from the product installed on the server, e.g., the product installed on the server may be a new version, but the system determines within a high confidence level that the application in not allowed on the server. In some embodiments, however, the list distinguishes between versions such that an earlier version may be not allowed but a later version is permitted.

In block 260, the system determines an allowed product as an alternative to the non-allowed product. If the system determines that a product identified on the server is not allowed, the system may determine an alternative product that is permitted. For example, the system may determine that an instant messaging application is not permitted on the server but that a different instant messaging application is permitted. In some embodiments, the alternative product is a product for which the institution has a license. In some embodiments, the system determines an alternative product that performs the same functionality but without the undesired aspects of the non-allowed product. In some embodiments, no alternative is provided. For example, an institution may prohibit a certain type of social networking application be installed on the application. The system may determine that the application is installed but not recommend an alternative, or recommend an alternative that is unrelated to the function performed by the social networking application.

In an embodiment, the system determines the alternative based on accessing the database and identifying the non-allowed product, which may include information on permitted alternatives. The list of permitted alternatives may be provided by a system administrator, developer, or the like.

In block 270, the system provides a report to a user comprising the non-allowed product and the alternative allowed product. In some embodiments, the system provides a report upon request of the user, e.g., the system administrator. The system may provide a report comprising all of the non-allowed products on the server as well as recommended alternatives. In some embodiments, additional information is present in the report, such as the identity of the person or application that installed the non-allowed products, the length of time the non-allowed product has been installed, the user of the non-allowed product, or the like. In some embodiments, the system also prepares various high level reports showing overall compliance across multiple categories, such as by manager, by division.

In an embodiment, the system also removes the non-allowed product. In some embodiments, the system offers to remove the non-allowed product and does so upon receiving confirmation from the user. In some embodiments, the system automatically removes the non-allowed product. In still further embodiments, the system installs the recommended alternative in the non-allowed products place.

Advantageously, the system monitors installation of products on servers over a network and identifies non-allowed products. The system may recommend alternative products to replace the non-allowed products. In many situations, users of computer systems install applications on personal computers associated with the network without first seeking guidance from a system administrator. The installed applications may not be desired for various reasons but it is challenging for the system administrator to identify and track the installation across a large network of servers. The disclosed system not only automates the scanning and identification processes but also recommends alternatives, in some embodiments, in order to maintain functionality.

FIG. 3 illustrates a system 300 for monitoring application development standards, wherein the method evaluates application source code and identifies non-approved application code, in accordance with an embodiment of the present disclosure. As illustrated in FIG. 3, the computer systems 302 of users 304 are operatively coupled, via a network 306, to at least one server 308 and a database 310. In this way, the users 304 may utilize the user computer systems 302 to monitor application code 326 on the server 308 via the system. FIG. 3 illustrates only one example of embodiments of an monitoring system 300, and it will be appreciated that in other embodiments one or more of the systems (e.g., computers, mobile devices, servers, or other like systems) may be combined into a single system or be made up of multiple systems.

The network 306 may be a global area network (GAN), such as the Internet, a wide area network (WAN), a local area network (LAN), or any other type of network or combination of networks. The network 306 may provide for wireline, wireless, or a combination of wireline and wireless communication between devices on the network.

As illustrated in FIG. 3, the user computer systems 302 generally comprise a communication device 312, a processing device 314, and a memory device 316. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 314 is operatively coupled to the communication device 312 and the memory device 316. The processing device 314 uses the communication device 312 to communicate with the network 306 and other devices on the network 306, such as, but not limited to, the server 308 and the database 310. As such, the communication device 312 generally comprises a modem, server, or other device for communicating with other devices on the network 306, and a display, camera, keypad, mouse, keyboard, microphone, and/or speakers for communicating with one or more users 304. The user computer systems 302 may include, for example, a personal device, which may be a personal computer, a laptop, a mobile device (e.g., phone, smartphone, tablet, or personal display device ("PDA"), or the like) or other like devices whether or not the devices are mentioned within this specification. In some embodiments, the user computer systems 302 could include a data capture device that is operatively coupled to the communication device 312, processing device 314, and the memory device 316. The data capture device could include devices such as, but not limited to a location determining device, such as a radio frequency identification ("RFID") device, a global positioning satellite ("GPS") device, Wi-Fi triangulation device, or the like, which can be used by a user 304, institution, or the like to capture information from a user 304, such as but not limited to the location of the user 304.

As further illustrated in FIG. 3, the user computer systems 302 comprises computer-readable instructions 318 stored in the memory device 316, which in one embodiment includes the computer-readable instructions 318 of a monitoring application 320 (e.g., an application that scans application code on servers and identifies products for comparison to a list in the database). In some embodiments, the memory device 316 includes a datastore 322 for storing data related to the user computer system 302, including but not limited to data created and/or used by monitoring application 320, e.g., historical records of monitoring, identification of products, and the like.

As further illustrated in FIG. 3, the server 308 generally includes a communication device 312, a processing device 314, and a memory device 316. The processing device 314 is operatively coupled to the communication device 312 and the memory device 316. The processing device 314 uses the communication device 312 to communicate with the network 306, and other devices on the network 306. As such, the communication device 312 generally comprises a modem, server, or other device(s) for communicating with other devices on the network 306.

As illustrated in FIG. 3, the server 308 includes computer-readable program instructions 324 stored in the memory device 316, which in one embodiment includes the computer-readable instructions 324 and application code 326. In some embodiments, the memory device 316 includes a datastore 328 for storing data related to the server 308, including but not limited to data created and/or used by the application code 326. The application code 326 includes human readable or computer readable program code associated with actions performed by applications installed on the server.

In some embodiments, the database 310 includes the communication device 312, processing device 314, and memory device 316 as disclosed herein. The memory device 316 may include computer readable instructions that contain the list of non-allowed products 328 and the list of recommended products 330, configured as applications. In some embodiments, the memory device also includes a database 332 comprising information related to the non-allowed and the recommended applications.

It is understood that the servers, systems, and devices described herein illustrate one embodiment. It is further understood that one or more of the servers, systems, and devices can be combined in other embodiments and still function in the same or similar way as the embodiments described herein.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present disclosure may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as, for example, a propagation signal including computer-executable program code portions embodied therein.

One or more computer-executable program code portions for carrying out operations of the present disclosure may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

Some embodiments of the present disclosure are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present disclosure.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the disclosure. Therefore, it is to be understood that, within the scope of the appended claims, the disclosure may be practiced other than as specifically described herein.

What is claimed is:

1. An apparatus for monitoring application development standards, wherein the apparatus evaluates application source code and identifies non-approved application code, whereby recommended alternative application code may be recommended, the apparatus comprising:
   a memory;
   a computing processor; and
   a module stored in the memory, said module comprising instruction code executable by one or more computing processors, and configured to cause the one or more computing processors to:
      access application code on a server associated with a network, wherein the application code is installed on the server;
      scan the application code to identify applications or portions of applications that are integrated into the application code;
      identify products in the application code based on the scan, wherein the product is identified based on a diagnostic feature of the product determined based on the scan of the application, wherein the diagnostic feature is selected from the group consisting of metadata associated with the product, directory structure associated with the product, and keywords associated with the product;
      compare the products identified in the application code to a list of non-allowed products, wherein the list is stored in a database;
      identify non-allowed products in the application code based on the comparison of the products to the list;
      determine an allowed product as an alternative to the non-allowed product;
      remove the non-allowed product from the server;
      install the alternative allowed product on the server; and
      provide a report to a user comprising the non-allowed product, the alternative allowed product, identities of persons that installed the non-allowed products on the server, and a length of time the non-allowed product was installed on the server.

2. The apparatus of claim 1, wherein the application code is converted from compiled code into human-readable code by a translator prior to scanning the application code.

3. The apparatus of claim 1, wherein comparing the products identified in the application code to the list of non-allowed products comprises determining within a predetermined confidence level that the product identified in the application code is a product on the list of non-allowed products.

4. The apparatus of claim 1, wherein the non-allowed product is associated with a license agreement for which the maximum number of licenses has been used and the alternative product is associated with a license agreement for which the maximum number of licenses has not been used.

5. A computer program product for monitoring application development standards, wherein the computer program product evaluates application source code and identifies non-approved application code, whereby recommended alternative application code may be recommended, the computer program product comprising:

a non-transitory computer-readable medium comprising:

an executable portion for causing a computer to access application code on a server associated with a network, wherein the application code is installed on the server;

an executable portion for causing a computer to scan the application code to identify applications or portions of applications that are integrated into the application code;

an executable portion for causing a computer to identify products in the application code based on the scan, wherein the product is identified based on a diagnostic feature of the product determined based on the scan of the application, wherein the diagnostic feature is selected from the group consisting of metadata associated with the product, directory structure associated with the product, and keywords associated with the product;

an executable portion for causing a computer to compare the products identified in the application code to a list of non-allowed products, wherein the list is stored in a database;

an executable portion for causing a computer to identify non-allowed products in the application code based on the comparison of the products to the list;

an executable portion for causing a computer to determine an allowed product as an alternative to the non-allowed product;

an executable portion for causing a computer to remove the non-allowed product from the server;

an executable portion for causing a computer to install the alternative allowed product on the server; and an executable portion for causing a computer to provide a report to a user comprising the non-allowed product, the alternative allowed product, identities of persons that installed the non-allowed products on the server, and a length of time the non-allowed product was installed on the server.

6. The computer program product according to claim 5, wherein the application code is converted from compiled code into human-readable code by a translator prior to scanning the application code.

7. The computer-program product according to claim 5, wherein comparing the products identified in the application code to the list of non-allowed products comprises determining within a predetermined confidence level that the product identified in the application code is a product on the list of non-allowed products.

8. The computer-program product according to claim 5, wherein comparing the products identified in the application code to the list of non-allowed products comprises determining within a predetermined confidence level that the product identified in the application code is a product on the list of non-allowed products.

9. A computer-implemented method for monitoring application development standards, wherein the method evaluates application source code and identifies non-approved application code, whereby recommended alternative application code may be recommended, the method comprising:

accessing application code on a server associated with a network, wherein the application code is installed on the server;

scanning the application code to identify applications or portions of applications that are integrated into the application code;

identifying products in the application code based on the scan, wherein the product is identified based on a diagnostic feature of the product determined based on the scan of the application, wherein the diagnostic feature is selected from the group consisting of metadata associated with the product, directory structure associated with the product, and keywords associated with the product;

comparing the products identified in the application code to a list of non-allowed products, wherein the list is stored in a database;

identifying non-allowed products in the application code based on the comparison of the products to the list;

determining, via a computing device processor, an allowed product as an alternative to the non-allowed product; and removing the non-allowed product from the server;

installing the alternative allowed product on the server; and providing a report to a user comprising the non-allowed product and the alternative allowed product, identities of persons that installed the non-allowed products on the server, and a length of time the non-allowed product was installed on the server.

10. The computer-implemented method of claim 9, wherein comparing the products identified in the application code to the list of non-allowed products comprises determining within a predetermined confidence level that the product identified in the application code is a product on the list of non-allowed products.

11. The computer-implemented method of claim 9, wherein the non-allowed product is associated with a license agreement for which the maximum number of licenses has been used and the alternative product is associated with a license agreement for which the maximum number of licenses has not been used.

* * * * *